(12) United States Patent
Park et al.

(10) Patent No.: US 12,371,083 B2
(45) Date of Patent: Jul. 29, 2025

(54) CHIP COLLECTING BOX FOR MACHINE TOOL

(71) Applicant: Gyu Park, Busan (KR)

(72) Inventors: Gyu Park, Busan (KR); Yeong Hui Park, Ulsan (KR); Jin A Park, Seoul (KR)

(73) Assignee: Gyu Park, Busan (KR)

(*) Notice: Subject to any disclaimer, the term of this patent is extended or adjusted under 35 U.S.C. 154(b) by 845 days.

(21) Appl. No.: 17/633,139

(22) PCT Filed: Jul. 13, 2020

(86) PCT No.: PCT/KR2020/009189
§ 371 (c)(1),
(2) Date: Feb. 4, 2022

(87) PCT Pub. No.: WO2021/025311
PCT Pub. Date: Feb. 11, 2021

(65) Prior Publication Data
US 2022/0324498 A1    Oct. 13, 2022

(30) Foreign Application Priority Data

Aug. 5, 2019   (KR) .................. 10-2019-0094724

(51) Int. Cl.
*B62B 3/00*   (2006.01)
*B23Q 11/00*  (2006.01)
*B65F 1/14*   (2006.01)

(52) U.S. Cl.
CPC .......... *B62B 3/004* (2013.01); *B23Q 11/0042* (2013.01); *B65F 1/1473* (2013.01); *B23Q 11/0067* (2013.01)

(58) Field of Classification Search
CPC . B62B 3/004; B23Q 11/0042; B23Q 11/0067; B65F 1/1473
See application file for complete search history.

(56) References Cited

U.S. PATENT DOCUMENTS

| 4,523,360 | A | * | 6/1985 | Giovanola | ........... B23Q 39/046 409/137 |
| 9,004,829 | B1 | * | 4/2015 | Lodge | ....................... B23C 3/35 409/137 |
| 2022/0179390 | A1 | * | 6/2022 | Shimoike | ......... G05B 19/40938 |

FOREIGN PATENT DOCUMENTS

| JP | 03-107280 U | 11/1991 |
| JP | 2001-278402 A | 10/2001 |
| JP | 2001-335105 A | 12/2001 |
| KR | 10-2004-0096474 A | 11/2004 |

(Continued)

*Primary Examiner* — Steven O Douglas
(74) *Attorney, Agent, or Firm* — Maschoff Brennan

(57) ABSTRACT

The present invention relates to a chip collecting box for a machine tool and, more specifically, to a chip collecting box, in which bottom plates that open and close by means of hinges are installed on opposite sides at the bottom of a chip collecting box body having open upper and lower portions. When an opening cord is pulling while the chip collecting box body is in an upwardly raised state, the bottom plates on opposite sides become unlocked and open toward the bottom such that machine tool chips stored in the chip collecting box are discharged downward. When a closing cord is pulling after the chips are discharged, the bottom plates on opposite sides are closed by the closing cord and become hooked on a hooking means.

4 Claims, 14 Drawing Sheets

(56) References Cited

FOREIGN PATENT DOCUMENTS

| | | | |
|---|---|---|---|
| KR | 10-1909741 | B1 | 10/2018 |
| KR | 10-0990883 | B1 | 3/2020 |
| KR | 10-2085046 | B1 | 3/2020 |

* cited by examiner

[FIG. 1]
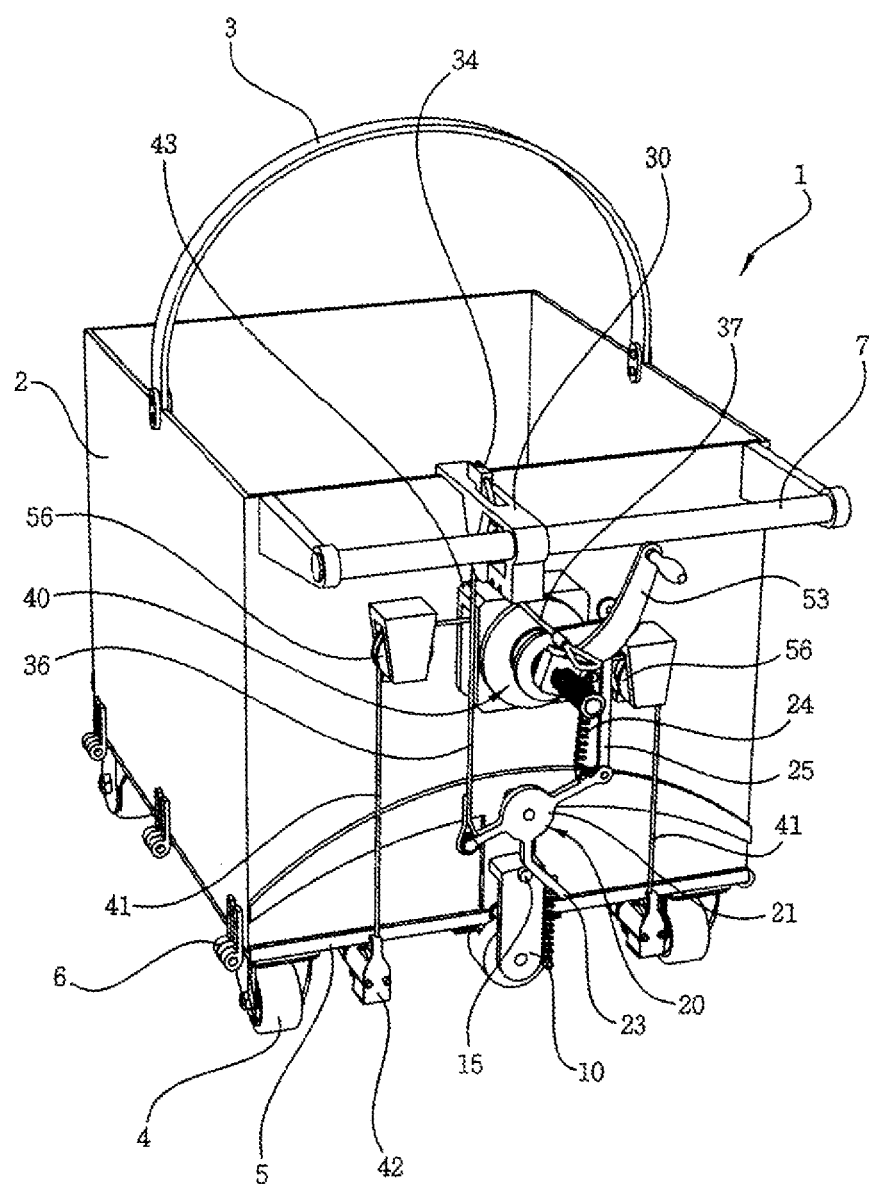

[FIG. 2]
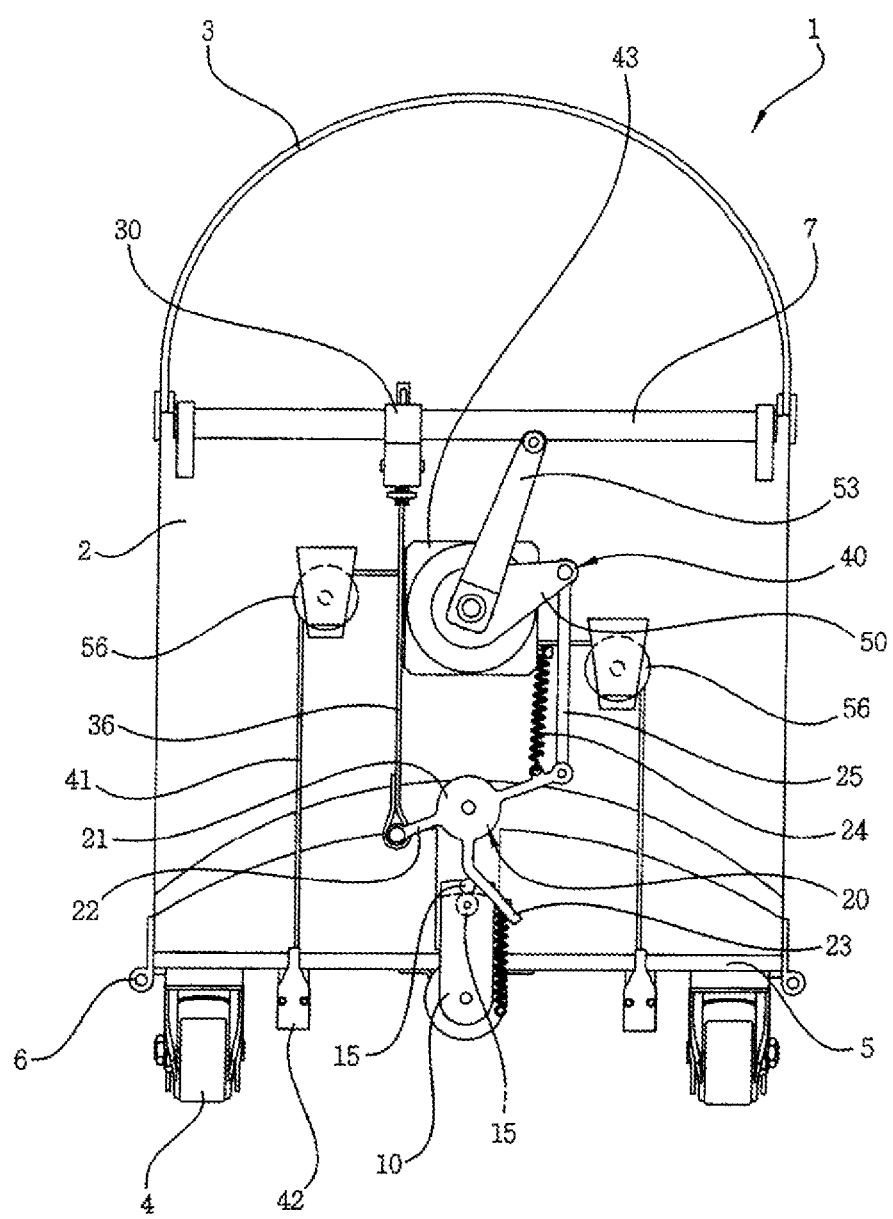

[FIG. 3]
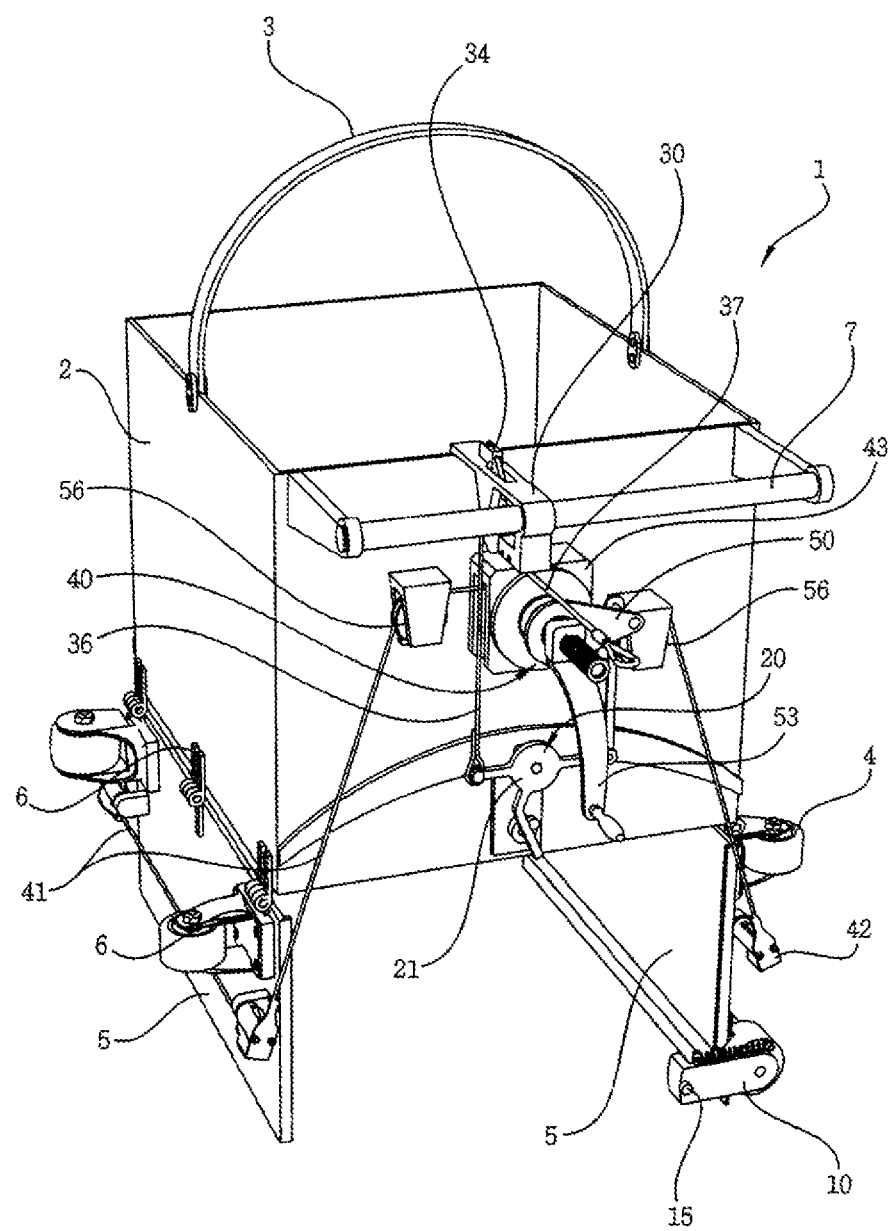

[FIG. 4]
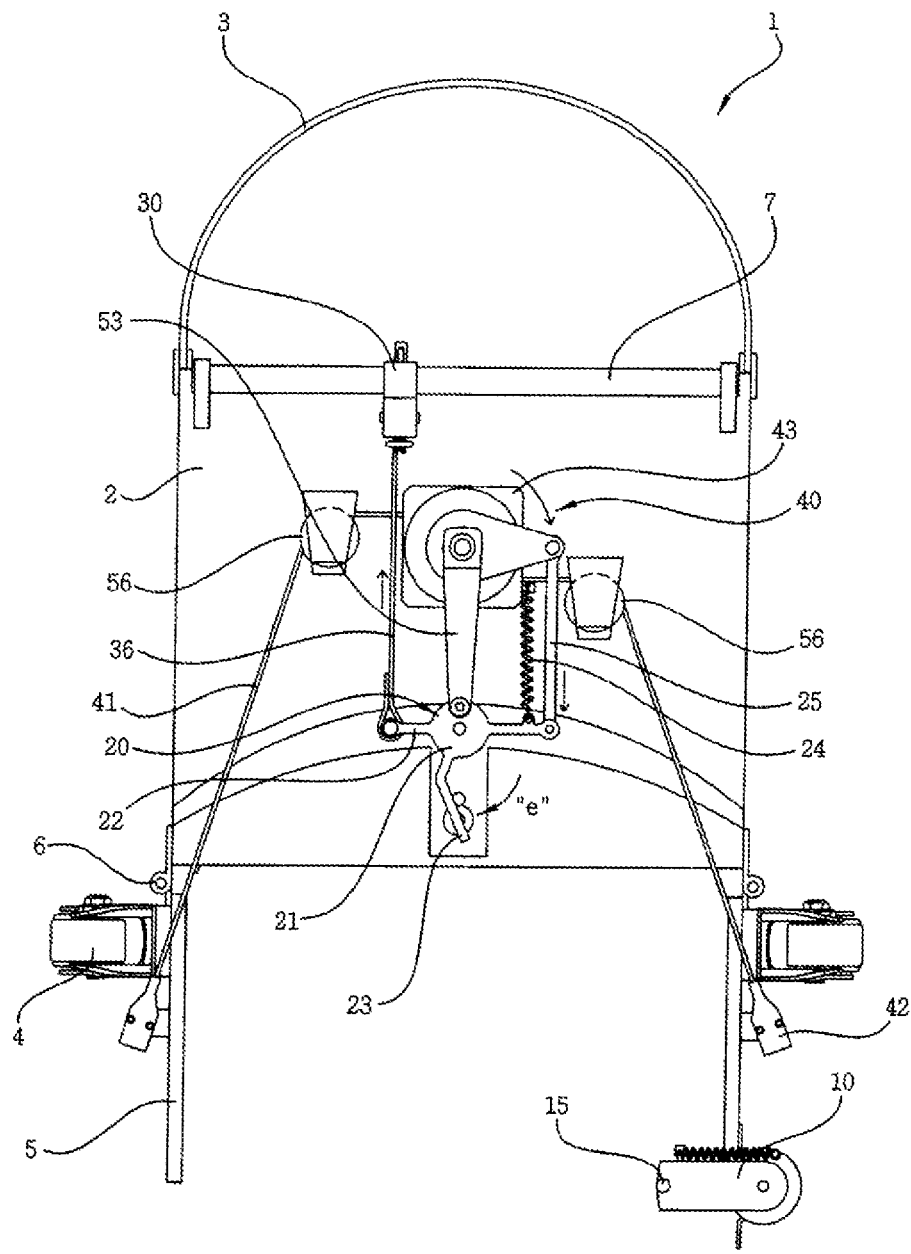

[FIG. 5]
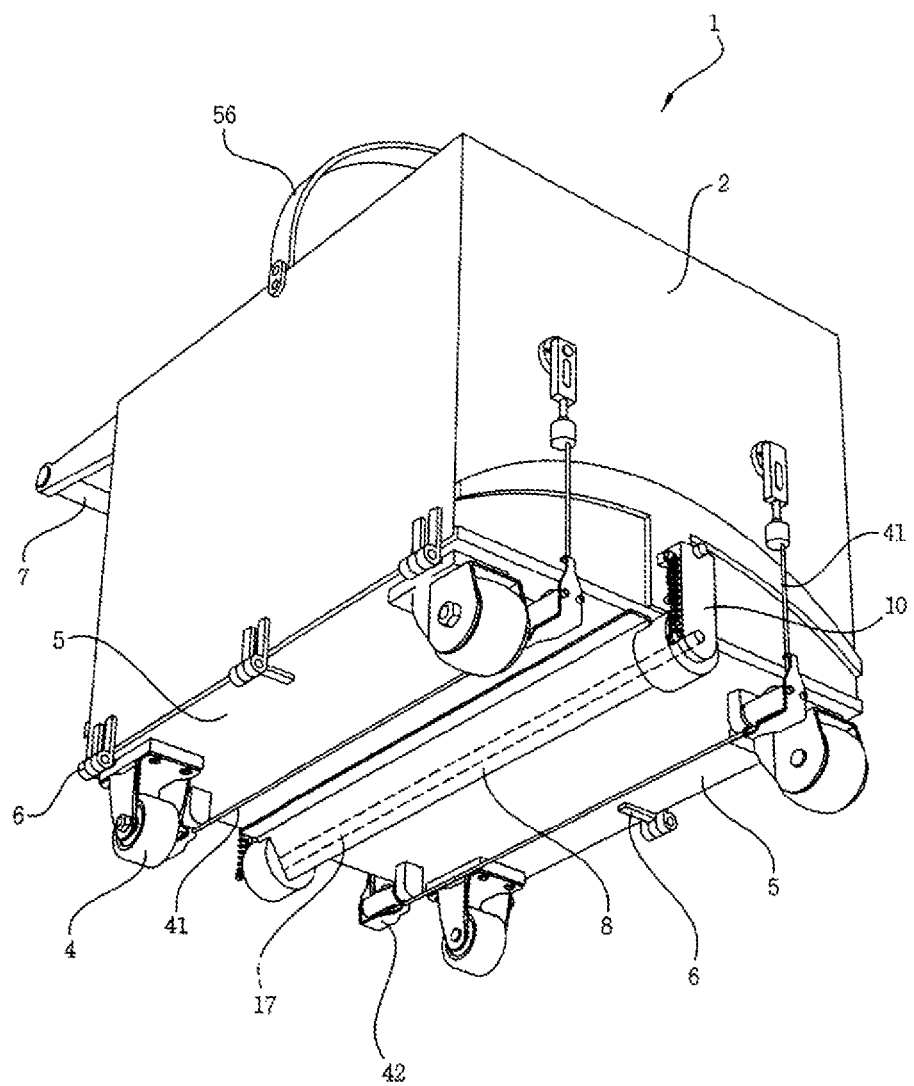

[FIG. 6]
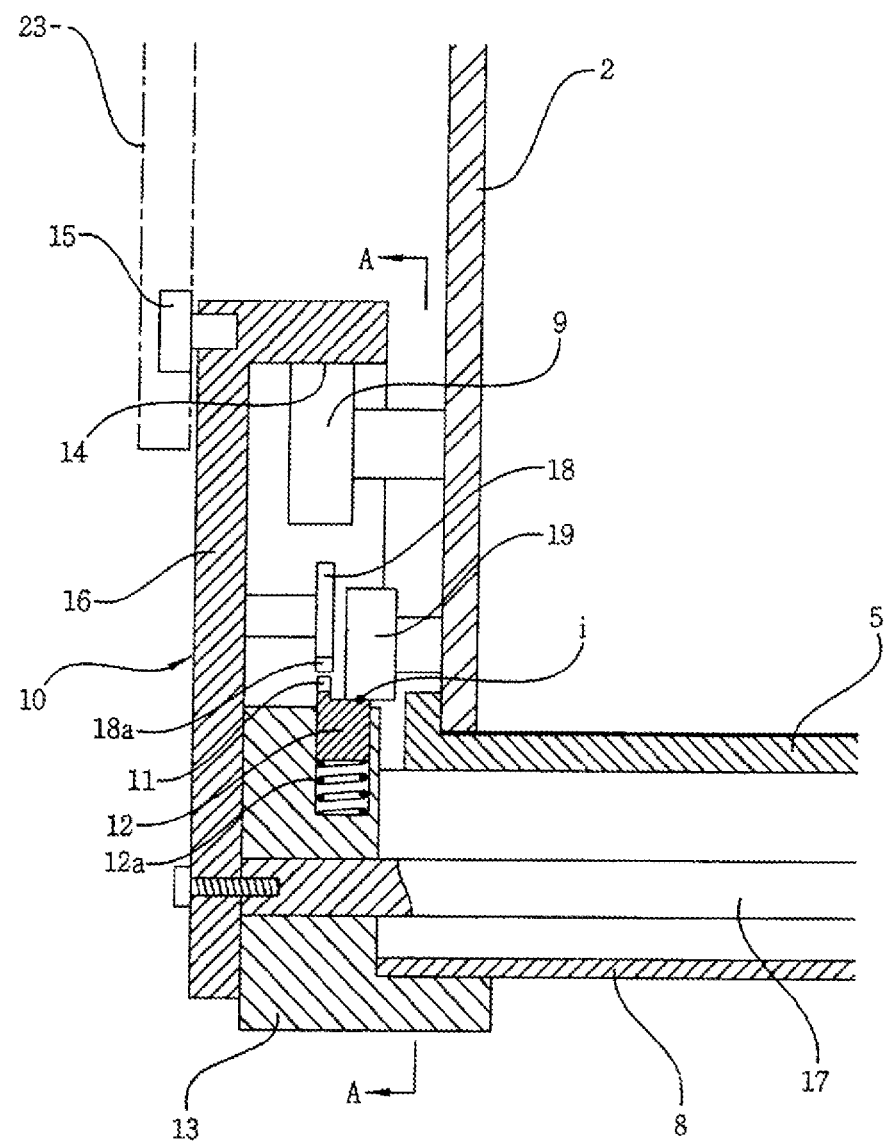

[FIG. 7]
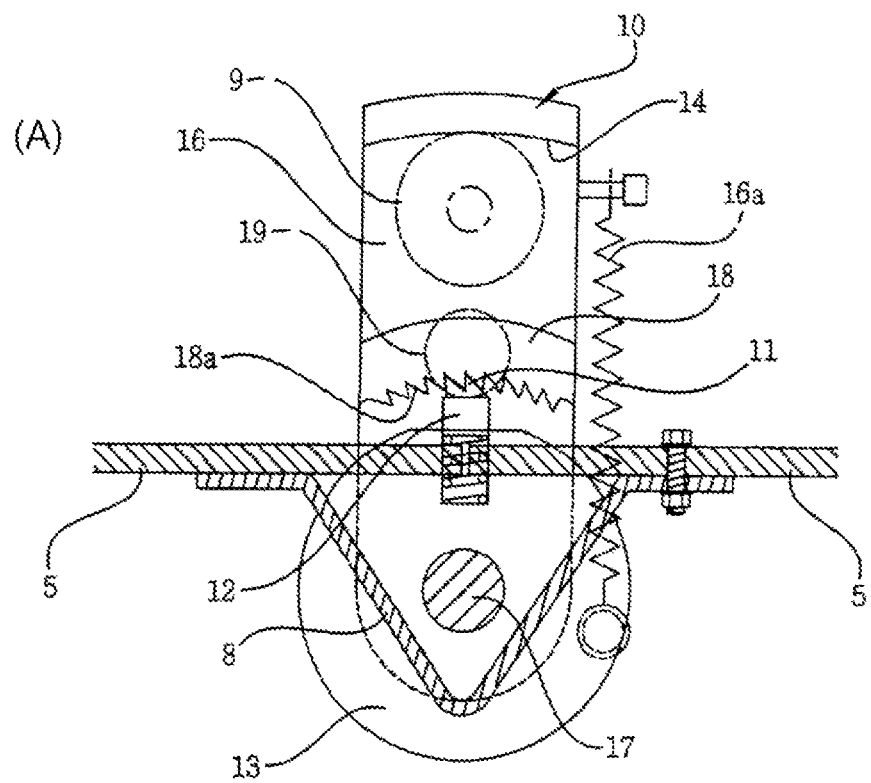
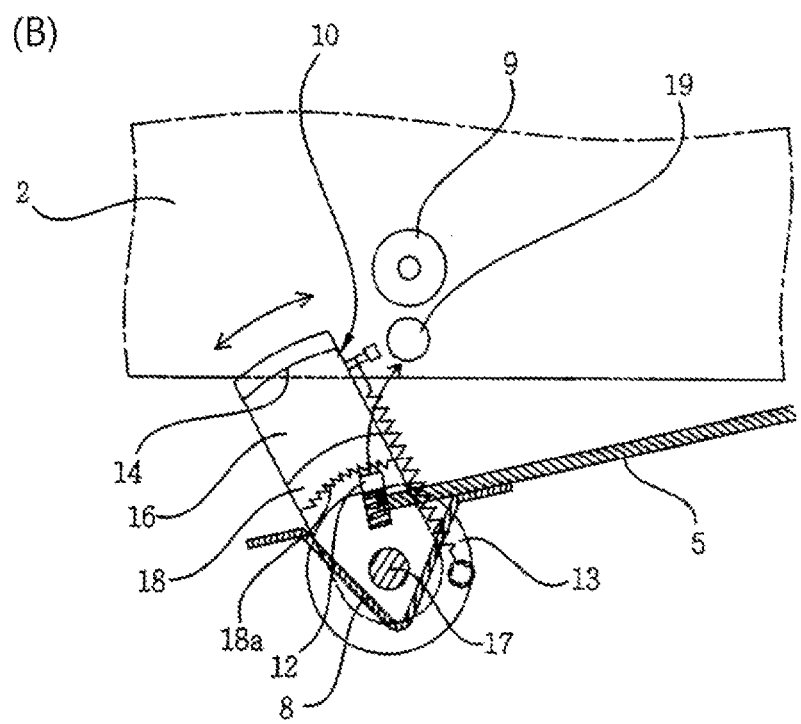

[FIG. 8]
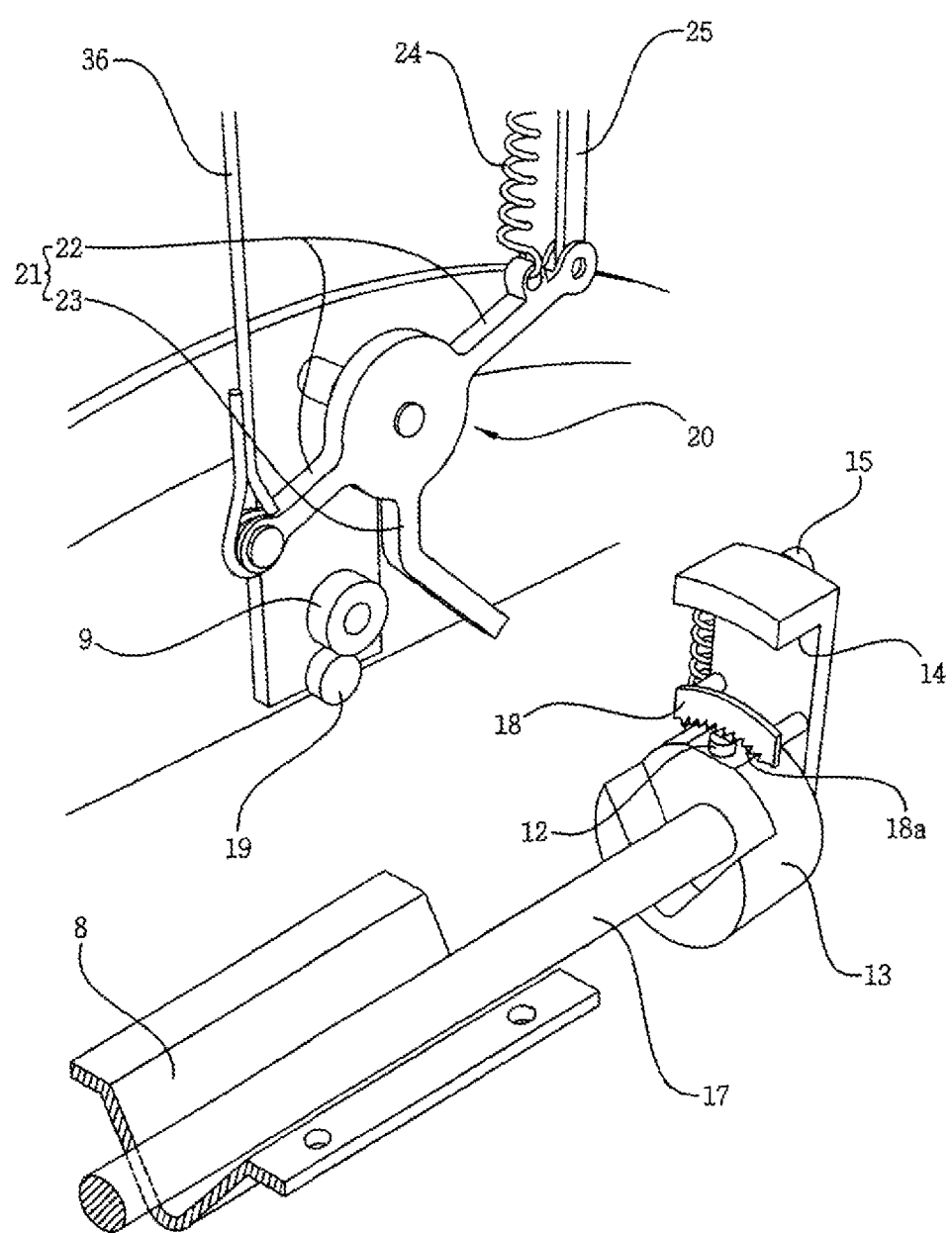

[FIG. 9]
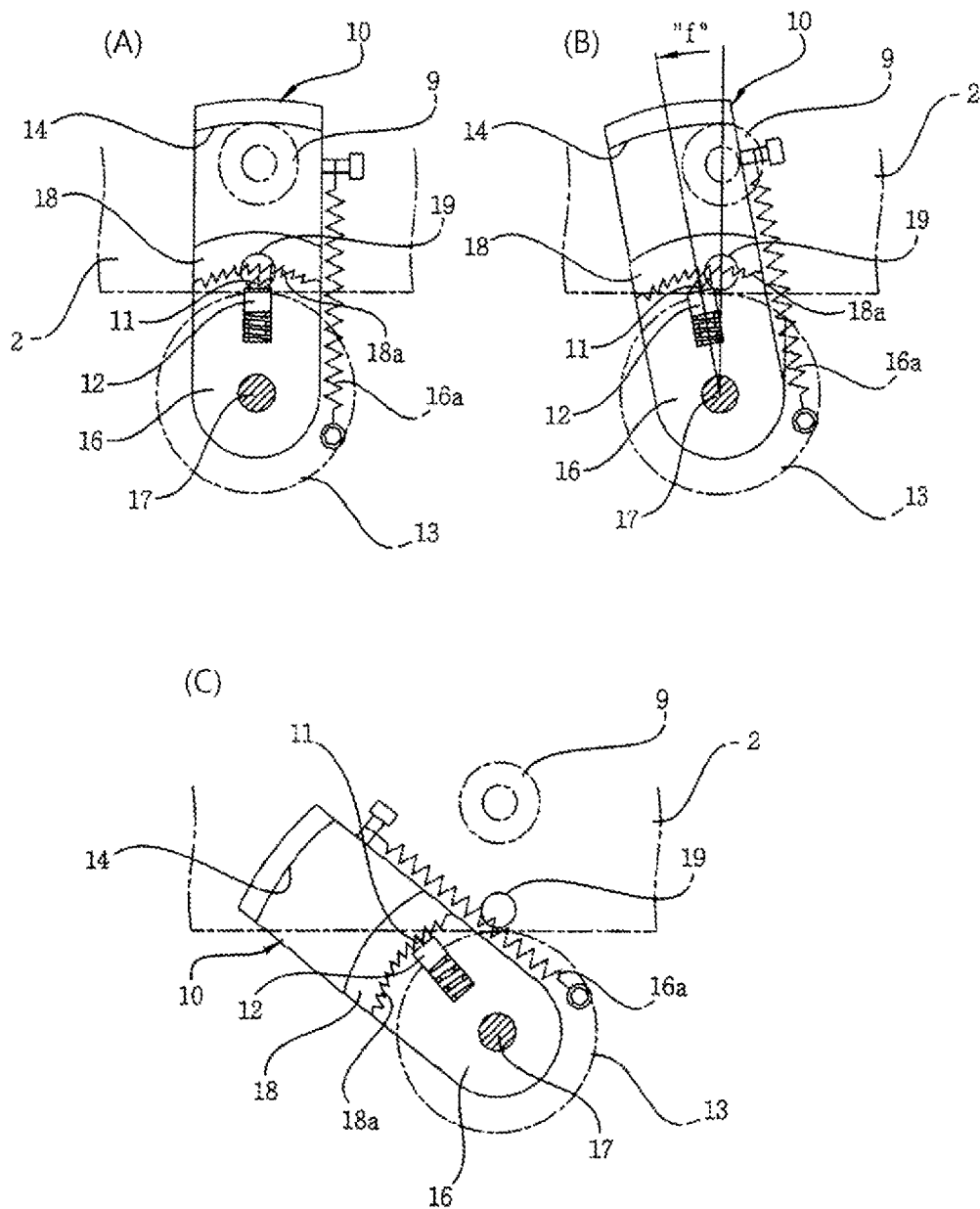

[FIG. 10]
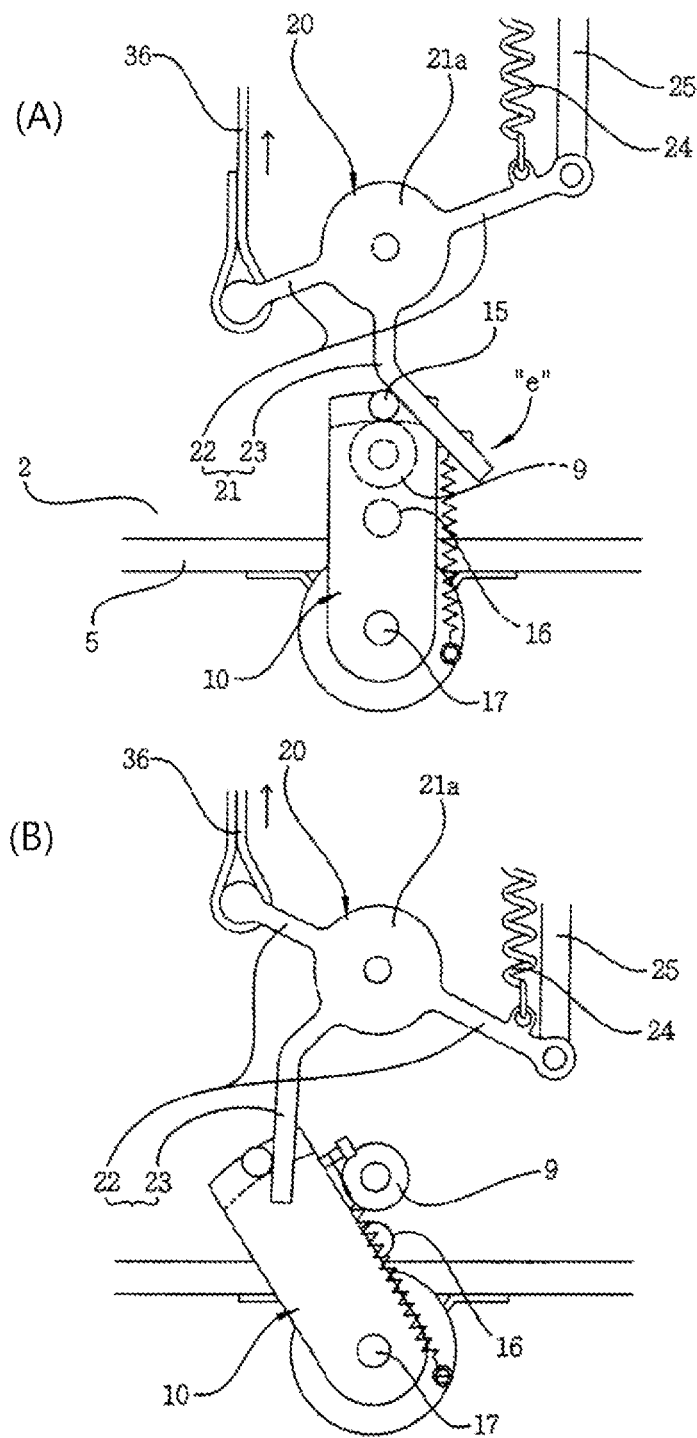

[FIG. 11]
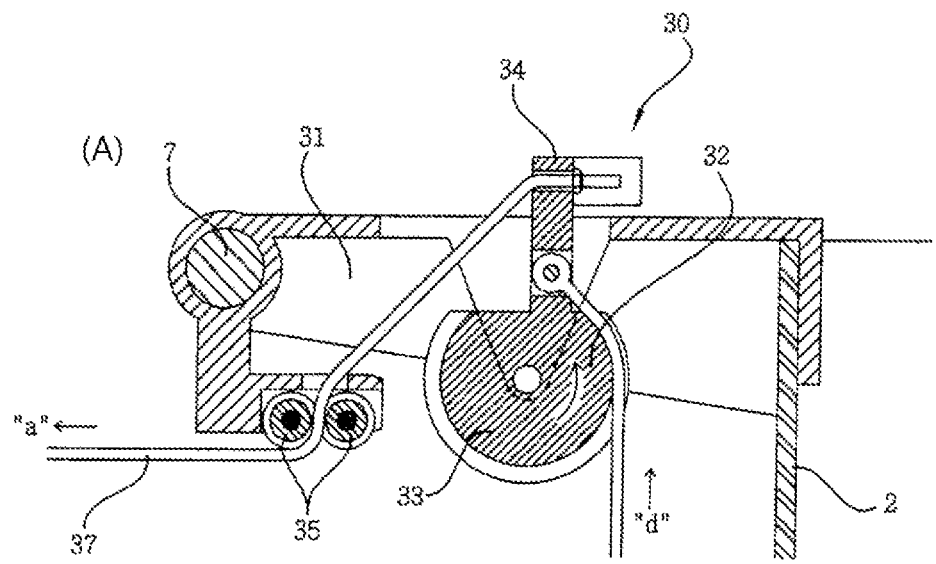
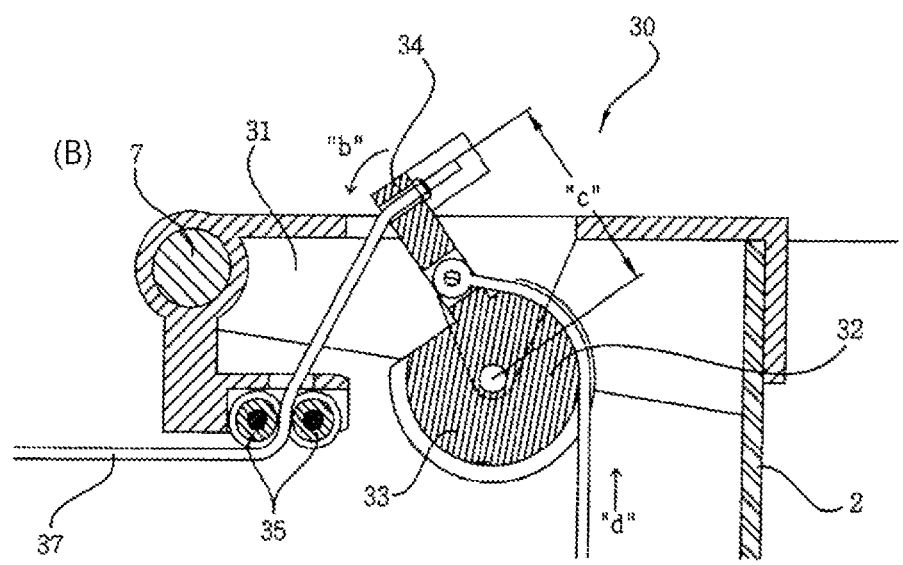

[FIG. 12]
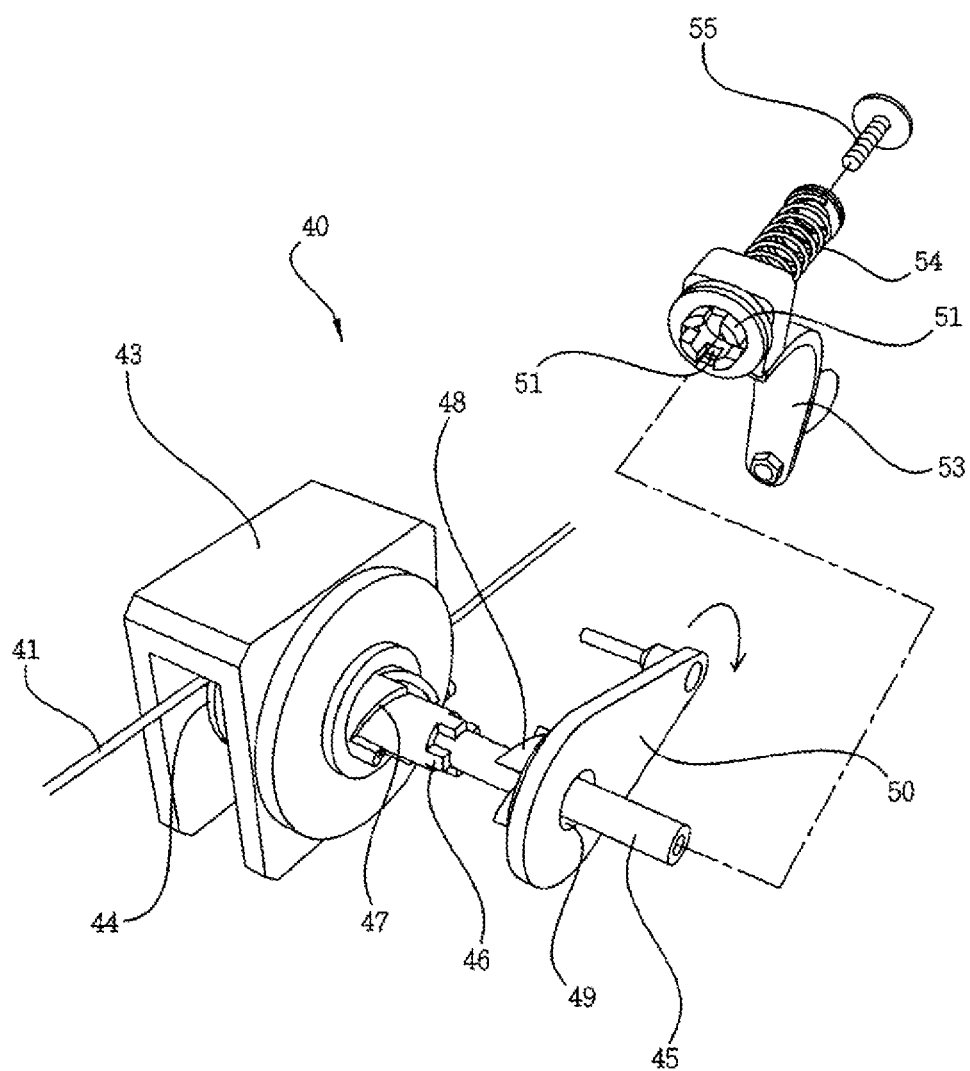

[FIG. 13]
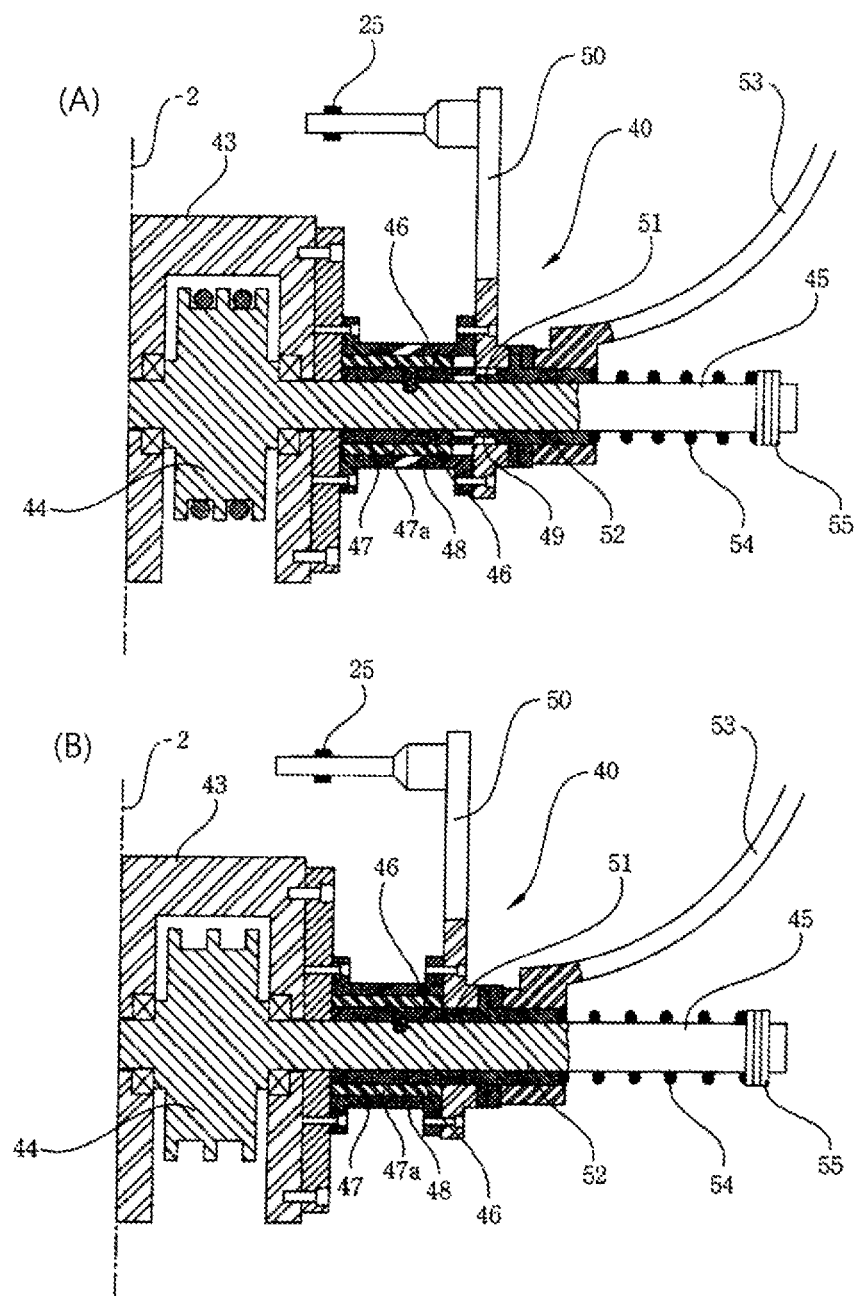

[FIG. 14]
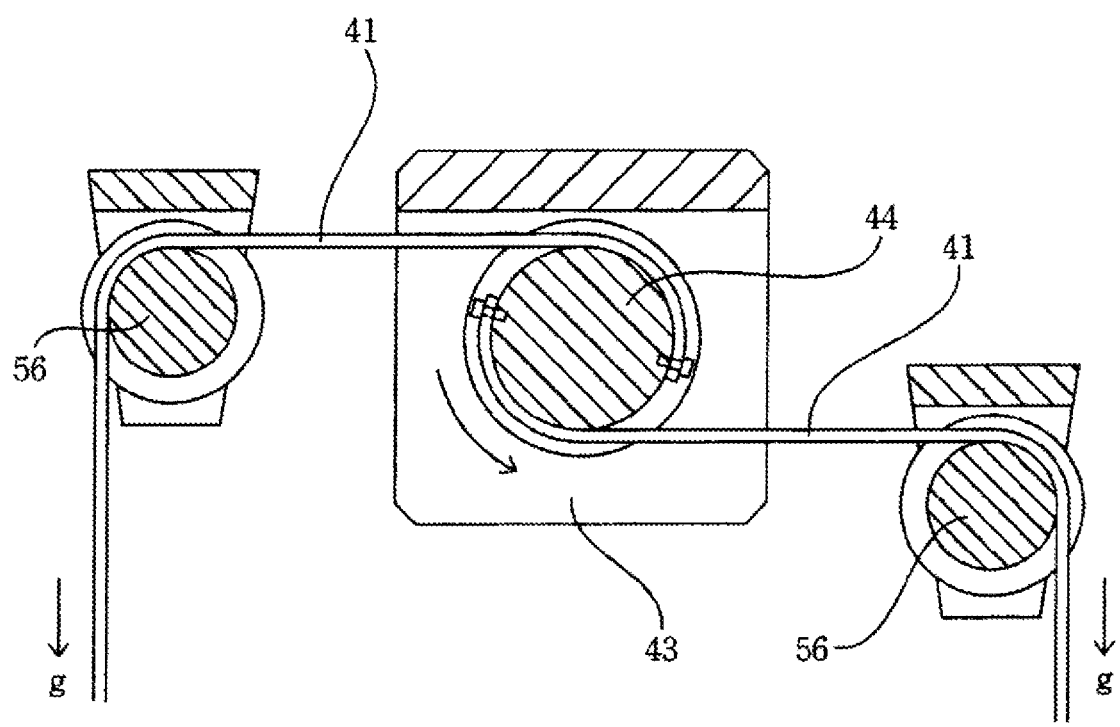

CHIP COLLECTING BOX FOR MACHINE TOOL

TECHNICAL FIELD

The present invention relates to a chip collection box for a machine tool and, more specifically, a chip collection box for a machine tool, which includes a collection box body having open top and bottom portions, and base plates installed on opposite sides at the bottom of the collection box body to be opened and closed in a hinged manner, wherein, when an opening cord is pulled while lifting the chip collection box upwardly, both of the base plates are released from a locking state and opened downward so that chips for a machine tool contained in the chip collection box are discharged downward, and, when a closing cord is pulled after the chips are discharged, the opposite base plates are closed by the closing cord and then locked on a locking means.

BACKGROUND ART

As one of prior inventions, the invention in the Korean Patent Registration No. 10-0990883 (entitled "a loading box for chip collection) has been disclosed from the published gazette thereof. Although this invention has a common point with the present invention in that both inventions are used as a collection box to collect chips for machine tools, both are absolutely different from each other in terms of structures and operational mechanisms thereof. Therefore, the above conventional invention is not suitable for comparison with the present invention.

According to the above conventional invention, a main body of the loading box is inserted and mounted on a hook of a forklift, and is rotated by a loading mechanism so that the main body becomes inclined to allow the collected chips to be discharged to the outside through an opening and closing cover. Therefore, there is a problem that this invention cannot be used at all in a field without the forklift.

DISCLOSURE

Technical Problem

The present invention is to solve the above problem, specifically, an object of the present invention is to provide a chip collection box for a machine tool, including: a collection box body that has open top and bottom portions; and base plates installed on opposite sides at the bottom of the collection box body to be opened and closed in a hinged manner, wherein, when an opening cord is pulled while lifting the chip collection box upwardly, both of the base plates are released from a locking state and opened downward so that chips for a machine tool contained in the chip collection box are discharged downward, and, when a closing cord is pulled after the chips are discharged, the opposite base plates are closed by the same and then locked on a locking means.

Technical Solution

In order to achieve the above object, the present invention provides a chip collection box for a machine tool, characterized with specific configurations in that: a collection box body having open top and bottom portions is provided with a suspending member on the upper portion, and base plates with wheels mounted on the bottom thereof are installed on opposite sides at the bottom of the collection box body in order to open and close the open bottom portion of the collection box body in a hinged manner by means of a hinge member;

opposite outer ends of the opposite base plates may be installed in a hinged manner on opposite sides at the bottom portion of the collection box body by the hinge, and a handle may be installed on a front upper side of the collection box body to protrude forward, wherein the handle is provided to hold and push the chip collection box by hands;

a locking protrusion may be installed on a lower portion in the center of each of front and rear plates of the collection box body, an oil tray may be installed throughout the entire length of a free end of one base plate to support a free end of the other base plate while preventing oil from falling, and a locking device rotatably engaged with the front and rear locking protrusions may be installed on front and rear sides of the oil tray; and an unlocking device may be installed on the front and rear plates of the collection box body above the locking protrusion, in order to release the locking state of the locking device locked on the locking protrusion, a closing cord guide may be installed on the bottom of the front and rear sides of each of the opposite base plates, and a closing cord pulling device may be installed on the front plate of the collection box body above the unlocking device, wherein two of the closing cords wound on a winch member of the closing cord pulling device are guided to both closing cord guides, respectively, while the ends of the closing cords are fixed to the rear plate of the collection box body, respectively.

Advantageous Effects

As described above, the chip collection box for a machine tool of the present invention may simply and effectively discharge chips typically discharged from a factory, since the base plates mounted on opposite sides at the bottom of the collection box body can be opened and closed in a hinged manner by pulling the opening cord and the closing cord using a ceiling crane that normally exists in any of even small factories having machine tools from which chips are discharged.

DESCRIPTION OF DRAWINGS

FIG. 1 is a front perspective view showing a state in which the base plate of the chip collection box according to the present invention is closed.

FIG. 2 is a front view showing a state in which the base plate of the chip collection box according to the present invention is closed.

FIG. 3 is a front perspective view showing a state in which the base plate of the chip collection box according to the present invention is opened.

FIG. 4 is a front view showing a state in which the base plate of the chip collection box according to the present invention is opened.

FIG. 5 is a bottom perspective view showing a state in which the base plate of the chip collection box according to the present invention is closed.

FIG. 6 is a cross-sectional view showing an installation state of the locking device included in the present invention.

FIGS. 7(a) and (b) are a cross-sectional view taken along line A-A of FIG. 6 and a cross-sectional view showing an open state of one base plate, respectively.

FIG. 8 is a perspective view showing an installation state of the locking device and the unlocking device included in the present invention.

FIGS. 9(a), (b) and (c) are use state diagrams showing an operational mechanism of the locking device included in the present invention.

FIGS. 10(a) and (b) are use state diagrams showing an operational mechanism of the unlocking device included in the present invention.

FIGS. 11(a) and (b) are cross-sectional views showing a use state of the opening cord connection member of the unlocking device included in the present invention.

FIG. 12 is an exploded perspective view showing the closing cord pulling device included in the present invention.

FIGS. 13(a) and (b) are plan cross-sectional views showing an operational mechanism of the closing cord pulling device included in the present invention.

FIG. 14 is a cross-sectional view showing an installation state of the closing cord pulled by the closing cord pulling device included in the present invention.

DETAILED DESCRIPTION OF PREFERRED EMBODIMENTS OF INVENTION

Hereinafter, a chip collection box for a machine tool according to the present invention will be described with reference to FIGS. 1 to 14 in the accompanying drawings.

A chip collection box 1 according to the present invention, as shown in FIGS. 1 to 5, may include: a collection box body 2 having open top and bottom portions, wherein a suspending member 3 is provided on top of the collection box body 2 in order to lift the chip collection box 1 by a crane; and base plates 5 with wheels 4 mounted on the bottom surface thereof, which are installed on opposite sides at the bottom of the collection box body 2 so as to open and close the open bottom portion of the collection box body 2 in a hinged manner by a hinge 6.

Further, opposite outer ends of opposite base plates 5 may be disposed to be hinged with opposite sides at the bottom of the collection box body 2 by the hinge 6, while a handle 7 may be provided on a front upper portion of the collection box body 2 to protrude forward, so as to hold and push the chip collection box 1 by hands.

Further, a locking protrusion 9 and a latch presser 19 may be installed vertically on lower portions in the center of front and rear plates of the collection box body 2, respectively. Further, an oil tray 8 may be installed throughout the entire length of a free end of one base plate 5 to support a free end of the other base plate 5 while preventing oil from falling, and a locking device 10 rotatably engaged with the front and rear locking protrusions 9 may be installed in front and rear directions of the oil tray 8.

On the front and rear plates of the collection box body 2 above the locking protrusion 9, an unlocking device 20 to release a locking state of the locking device 10 locked in the locking protrusion 9 may be installed, while opposite base plates 5 may be provided with closing cord guides 42, respectively, on the bottom of the front and rear sides thereof. Further, a closing cord pulling device 40 may be installed on the front plate of the collection box body 2 above the unlocking device 20, wherein two closing cords 41 wound around a winch member of the closing cord pulling device 40, respectively, are guided to both closing cord guides 42 while the ends of the closing cords 41 are fixedly coupled to the rear plate of the collection box body 2, respectively.

As shown in FIGS. 1, 2 and 6 to 8, with regard the locking device 10, lower blocks 13 may be mounted at front and rear ends of the oil tray 8, which has a trough portion in a "V" shape therein, to face each other such that a latch 12 having a tooth portion 11 on an upper side thereof is disposed to elastically move up and down in a vertical direction by a spring, and a rotary shaft 17 may be installed in the center of the lower blocks 13 to penetrate front and rear sides thereof.

Further, on front and rear ends of the rotary shaft 17 penetrating the front and rear sides toward the outside of the lower blocks 13, a locking part 14 locked on the inside and outside of the locking protrusion 9 to be hooked on the top thereof may be coupled with a lower part of a locking body 16, which has an outer protrusion 15 to be pushed by a lower lever 23 of the unlocking device 20, by means of bolts. Further, between one upper side of the locking body 16 and a predetermined position outside the lower block 13, a spring 16a may be provided to return the locking body 16 rotating about the rotary shaft 17 to its original position.

Further, a latch plate 18 in which several teeth 18a selectively engaged with the tooth portion 11 of the latch 12 are formed downward may be installed on an inner surface of the locking body 16, while a latch presser 19 may be provided in the collection box body 2 below the locking protrusion wherein the latch presser 19 presses the top surface of the latch 12 so as to release engagement between the teeth 18a of the latch plate 18 and the tooth portion 11 of the latch 12.

With regard to the unlocking device 20, as shown in FIGS. 1, 2 and 10, a rotary lever 21 may be rotatably mounted on the front plate of the collection box body 2 above the locking protrusion 9, wherein the rotary lever 21 includes horizontal levers 22 and a lower lever 23 formed on opposite sides and the lower side of a central boss part 21a, respectively. Further, the unlocking device 20 may be provided with an opening cord pulling device 30 on top thereof, in which a first opening cord 36 exists to pull the horizontal lever 22 on one side ("the one horizontal lever") of the rotary lever 21. On the other hand, a spring 24 for returning the rotated rotary lever 21 to its original position and a connection rod 25 for pulling the outer end of an idle lever 50, respectively, may be provided on the horizontal lever 22 on the other side ("the other horizontal lever") of the rotary lever 21.

As shown in FIGS. 1, 2 and 11, with regard to the opening cord pulling device 30, an opening cord pulling member 32 and an opening cord guide roller 35, respectively, may be mounted on an opening cord bracket 31 installed on the upper portion of the collection box body 2, wherein the opening cord pulling member 32 is mounted on one side of a rotational body 33 rotating around an axis such that an eccentric protrusion 34 protrudes outward, a first opening cord 36 is connected between the eccentric protrusion 34 and the one horizontal lever 22, and a second opening cord 37 to release a locking state of the locking device 10 is disposed to be guided to an opening cord guide roller 35 and then to be exposed to the outside while an end of the second opening cord 37 is fixed on the outer end of the eccentric protrusion 34.

As shown in FIGS. 1, 2 and 12 to 14, with regard to the closing cord pulling device 40, a pulley housing 43 may be installed on the front plate of the collection box body 2, a pulley 44 may be mounted on the pulley housing 43 to freely rotate, wherein a clutch shaft 45 extending in front of the pulley 44 is installed to protrude to the front of the pulley housing 43, a male clutch part 46 is fixed on an outer periphery of the clutch shaft 45 in front of the pulley housing 43, and a tooth type first ratchet ring 47 is fixed on an outer periphery of the male clutch part 46.

Further, an idle lever 50 having a through-hole 49 formed thereon in a desired size, into which the male clutch part 46 can be fitted, may be provided on the outer periphery of the clutch shaft 45 in front of the male clutch part 46 so as to possibly run idling, wherein a second ratchet ring 48 detachably engaged with the first ratchet ring 47 is provided on an inner surface of the idle lever 50 outside the through-hole 49, and the other end of the connection rod 25 connected to the horizontal lever 22 of the rotary lever 21 is connected to an outer end of the idle lever 50 in a hinged manner.

Further, on the clutch shaft 45 outside the idle lever, a clutch pipe 52 may be movably installed in a longitudinal direction along the clutch shaft 45, wherein a female clutch part 51 detachably engaged with the male clutch part 45 via the through-hole 49 is formed on a front end of the clutch pipe 52. Further, a boss part of a rotational handle 53 may be fixed on the outside of the clutch pipe 52, a spring 54 may be provided on the clutch shaft 45 in front of the clutch pipe 52 to push the clutch pipe 42 toward the male clutch part 46, and a spring support 55 may be provided at a rear end of the clutch shaft 45.

Further, the ends of two closing cords 41 may be wound on the pulley 44 inside the pulley housing 43 in a fixed state, lateral rollers 56 may be installed on opposite sides of the pulley housing 43, respectively, in front of the collection boxy body 2, opposite closing cords 41 coming from the pulley 44 to opposite sides may be guided by the lateral rollers 56 to move downward, and then, guided to the front and rear opening cord pulling members 32 mounted on the base plate 5. Thereafter, the rear ends of the two closing cords 41 may be fixed on the rear plate of the collection box body 2.

Among reference numerals in the drawings, reference numeral "47a" denotes a bushing provided between the first ratchet ring 47 and the male clutch part 46.

An operational mechanism of the present invention configured as above will be described in detail with reference to FIGS. 1 to 14 as follows.

With regard to the chip collection box 1 according to the present invention, as shown in FIGS. 1 and 5, when the two base plates 5 installed at the bottom of the collection box body 2 is closed in a hinged manner, only the upper portion of the box may be opened. Therefore, chips generated during cutting and processing a workpiece by a machine tool may be stored inside the top-opened collection box 1.

Further, wheels 4 may be installed on the bottom of the chip collection box 1 while a handle 7 may be provided on a front plate of the collection box body 2 to push or pull the chip collection box 1 of the present invention, thereby moving the same like a wagon.

Further, as shown in FIG. 7, the oil tray 8 formed in a "V" shape at a free end of one base plate 5 mounted on either side, among opposite base plates 5 that are installed in a hinged manner on opposite sides at the bottom of the collection boxy body 2, may be installed throughout the entire length of the base plate 5, wherein the outside of the oil tray 9 is disposed to support the bottom portion of the other base plate 5 and, when these two base plates 5 are closed, the oil tray 8 may support a lower end of the other base plate 5 so that both of the base plates 5 are all closed and oil smeared on the chips contained in the chip collection box 1 may flow down to the oil tray 8, thereby being gathered in a trough portion therein.

As such, in the case where chips are present in the chip collection box 1 and the chips are to be poured out into a separate storage container or a loading box of a vehicle, a suspending member 3 mounted on an upper portion of the collection box body 2 may be hooked and lifted upward using any desired tool such as a ring of a ceiling crane installed in a factory or a fork of a forklift, followed by moving the box to a predetermined position in order to pour out the chips.

Then, by pulling the second opening cord 37 mounted on the chip collection box 1 floating in the air, the locking device 10 may be released (or unlocked) from a locking state on the locking protrusion 9 in the front and rear plates of the collection box body 2 while rotating by a predetermined angle, so as to open the base plates 5 downward. On the other hand, in the initial state before rotation of the locking device 10, the locking device 10 may be positioned in the vertical direction, as shown in FIGS. 1, 2, 6 and 9(*a*).

As such, when the locking device is positioned in the vertical direction, a lower portion of the latch presser 19 below the locking protrusion 9 may be in a state of pressing a top surface of the latch 12, which is elastically disposed inside the locking device 10, downward so that a tooth portion 11 of the latch 12 and a tooth portion 18a formed downward on the lower side of the latch plate 18 are not engaged with each other but spaced apart from each other. Therefore, when pushing the locking body 16 of the locking device 10 in a lateral direction, the locking body 16 may be in a state in which it can rotate by a predetermined angle around the rotary shaft 17, as shown in FIGS. 9(*b*) and (*c*).

In such state, when pulling the second opening cord 37, as shown in FIG. 11, the second opening cord 37 pulled like as "a" may be guided by the opening cord guide roller 35 to pull an eccentric protrusion 34 of the rotational body 33. Since the eccentric protrusion 34, in which an end of the second opening cord 37 is fixed, is located at a position protruding outward by a predetermined length "c" from the center of the rotational body 33, the second opening cord 37 may be pulled even with a small force and the rotational body 33 may rotate like as "b" by the force pulling the second opening cord 37.

As the rotational boy 33 rotates like as "b", the first opening cord 36 with a tip end positioned on the eccentric protrusion 34 may be pulled upward as shown in "d". Further, as shown in FIGS. 8 and 10, as the first opening cord 36 is pulled upward, the one horizontal lever 22 of the rotary lever 21 connected to the lower end of the first opening cord 36 may be pulled upward, and therefore, the rotary lever 21 may rotate like as "e".

When the rotary lever 21 rotates like as "e", the lower lever 23 protruding downward from the center of the rotary lever 21 may also rotate like as "e" and push the outer protrusion 15 above the locking device 10 installed on the lower portion of the rotary lever 21 in a rotational direction of the rotary lever 21.

At this time, the locking body 16 of the locking device 10 may rotate by a predetermined angle as shown in "f" of FIG. 9, since the tooth portion 11 of the latch 12 and the tooth portion 18a of the latch plate 18 are not engaged with each other but the lower portion of the locking body 16 is in a state of possibly rotating by the rotary shaft 17. In this case, the locking part 14 formed on an inner upper portion of the locking body 16 may be disposed and hooked on top of the locking protrusion 9 fixedly mounted on the front and rear plates of the collection box body 2. Therefore, in a process of which the locking body 16 rotates like as "f", the locking part 14 may be out of the locking protrusion 9 as shown in FIG. 9(*c*).

When the locking part 14 is out of the locking protrusion 9, one base plate 5, on which the locking device 10 and the oil tray 8 are provided, and the other base plate 5 opposed thereto may be completely opened downward due to the weight of the chips contained in the collection box body 2 as well as their own weight, as shown in FIG. 7(*b*) and FIGS. 3 and 4, whereby the chips contained in the chip collection box 1 would be poured downward at once.

At this time, the locking device 10 is installed at the front and rear sides of the one base plate 5 and, as shown in FIGS. 5, 6 and 8, the locking device 10 at the front and rear sides is connected to the rotary shaft 17, whereby the locking device 10 at the front and rear sides is released (or unlocked) from the locking protrusion 9 to thus simultaneously open both of the base plates 5.

Further, when the locking body 16 of the locking device 10 is released from the locking protrusion 9 and the base plates 5 are opened, the top surface of the latch 12 may escape the bottom of the latch presser 19 as shown in FIG. 9(*b*) and FIG. 6. Specifically, the top surface of the latch 12 may escape the bottom surface of the latch presser 19 and, at the same time, the latch 12 may move up by an elastic force of the spring 12*a* pushing the latch upward. As a result, as shown in FIG. 9(*c*), the tooth portion 11 at the upper side of the latch 12 is engaged with the tooth portion 18*a* at the lower side of the latch plate 18, whereby the locking body 15 may remain inclined to one side.

Further, when pulling the second opening cord 37 and opening the opposite base plates 5 downward, both of the closing cords 41 may be pulled downward, as shown in "g" of FIG. 14, due to a descending force of the base plates 5. In this case, since the closing cord 41 is wound around the pulley 44, the pulley 44 may rotate like as "h" and, as shown in FIGS. 12 and 13, the clutch shaft 45 installed in front of the center of the pulley 44 may also rotate equally.

As such, when the opposite base plates 5 are opened downward by pulling the second opening cord 37, the rotary lever 21 may rotate as shown in "e" of FIG. 4 and the horizontal lever 22 on the right side in the drawing may move down. As a result, the connection rod 25 connected to the horizontal lever and an outer end of the idle lever 50 on top of the connection rod may rotate downward.

In this regard, as shown in FIG. 12 and FIG. 13(*a*), when first and second ratchet rings 47 and 48, which are each formed in a right-angled triangle shape and are engaged with each other, slidingly contact at inclined surfaces thereof due to down-rotation of the outer end of the idle lever 50 and high right-angled straight portions of the inclined surfaces are in contact with each other, the idle lever 50 may be pushed to the front side where a rotational handle 53 is installed, and the male clutch part 46 and the female clutch part 51 mounted on the rotational handle 53 may be disengaged from each other so that the clutch shaft 45 can rotate but the rotational handle 53 does not rotate. Therefore, even when opposite base plates 5 are opened in a moment, there is no risk of hitting surrounding articles or workers.

In addition, after the opposite base plates 5 at the bottom of the collection box body 2 are opened by pulling the second opening cord 37 and the chips contained in the chip collection box 1 are poured downward, when loosing or relaxing the pulled second opening cord 37, the horizontal lever 22 at a side where the spring is provided may be lifted upward due to elasticity of the spring 24 provided to pull upward the other horizontal lever 22 both to the horizontal lever connected to the first opening cord 36 as shown in FIGS. 2, 4 and 10, so that the rotary lever 21 would rotate around the boss part 21*a* and thus return to its original state.

In this way, after the opposite base plates 5 are opened downward and the chips contained in the chip collection box 1 are discharged downward, the base plates 5 opened downward should be closed in order to reuse the chip collection box 1. For this purpose, the chip collection box 1 suspended from the crane is moved to a position where the rotational handle 53 of the closing cord pulling device 40 can be gripped and turned by a hand of a user, wherein the lower side of the base plate 5 opened downward must be suspended in the air as high as it does not touch the ground.

As such, after moving the chip collection box 1 to a desired position, as shown in FIGS. 1, 2 and 14, turning the rotational handle 53 of the closing cord pulling device 40 may close the base plates 5 while winding both of the closing cords 41 around a winch member of the closing cord pulling device 40, that is, the pulley 44. At this time, it is noted that, instead of holding and turning the rotational handle 53 by a hand, a motor may be provided and the pulley 44 may be rotated by means of a remote controller.

As described above, when turning the rotational handle 53 of the closing cord pulling device 40, as shown in FIGS. 12 to 14, the idle lever 50 may be pushed toward the first ratchet ring 47 by elasticity of the spring 54 provided in the closing cord pulling device 40 so that the first and second ratchet rings 47 and 48 can be engaged with each other and, in turn, the male clutch part 46 and the female clutch part 51 may be engaged with each other.

However, as shown in FIGS. 12 and 13, with regard to the idle lever 50, a through-hole 49 is typically formed in a desired size such that outer peripheries of the female and male clutch parts 51 and 46 are loosely fitted into the through-hole 49 so that the second ratchet ring 48 and the idle lever 50 run idle at the outer peripheries of the female and male clutch parts 51 and 46. Further, when turning the rotational handle 53, a rotational force is transmitted from the female clutch part 51 mounted on the rotational handle 53 to the male clutch part 46 engaged with the same, thereby rotating the clutch shaft 45.

Since the clutch shaft 45 rotating as described above is installed in the center of the pulley 44, the pulley 44 may rotate together and two closing cords 41 may be wound around the pulley 44. Then, these two closing cords 41 may pass through the closing cord guide 42 mounted on the base plate 5 and tip ends thereof may be fixed to the rear plate of the collection box body 2, so that the opposite base plates are lifted upward in a hinged manner and the top surfaces of the base plates 5 may come into contact with the bottom surface of the collection box body 2.

As described above, when opposite base plates 5 are lifted upward by winding opposite closing cords 41 around the pulley 44, the locking device 10 installed in one base plate 5 may be inclined and move up in a hinged manner as shown in FIGS. 9(*b*) and (*c*) and, at a time when an inner top surface of the latch 12 contacts a bottom surface of a round latch presser 19 as shown in "i" of FIG. 6, the latch 12 is pushed into the same, whereby the tooth portion 11 of the latch 12 and the tooth portion 18*a* of the latch plate 18 may be disengaged from each other and spaced apart from each other.

In this case, as shown in FIG. 7(*a*) and FIGS. 9(*a*) and (*b*), the locking body 16 is pulled due to elasticity of the spring 16*a* provided between the locking body 16 and the lower block 13, so that the upper portion of the locking body 16 can rotate around the rotary shaft 17, the locking part 14 formed on the upper side of the locking body 16 is raised above the latch presser 19 and thus is hooked on top of the locking protrusion 9. Further, even through the base plate 5, on which the locking device 10 including the locking body 16 is mounted, tends to descend due to its own weight, both of the base plates 5 would be kept locked without opening because the locking part 14 is hooked on the top of the locking protrusion 6.

INDUSTRIAL APPLICABILITY

The present invention relates to a chip collection box for gathering diverse chips generated in machine tools, and thus is industrially applicable.

The invention claimed is:

1. A chip collection box for a machine tool, characterized with specific configurations in that:
    a collection box body having open top and bottom portions is provided with a suspending member on a upper portion, and base plates with wheels mounted on a bottom thereof are installed on opposite sides at the bottom of the collection box body in order to open and close the open bottom portion of the collection box body in a hinged manner by means of a hinge member;
    opposite outer ends of the opposite base plates are installed in a hinged manner on opposite sides at the bottom of the collection box body by a hinge, and a handle is installed on a front upper side of the collection box body to protrude forward, wherein the handle is provided to hold and push the chip collection box by hands;
    a locking protrusion is installed on a lower portion in a center of each of front and rear plates of the collection box body, an oil tray is installed throughout an entire length of a free end of one base plate to support a free end of another base plate while preventing oil from falling, and a locking device rotatably engaged with the front and rear locking protrusions is installed on front and rear sides of the oil tray; and
    an unlocking device is installed on the front and rear plates of the collection box body above the locking protrusion, in order to release the locking state of the locking device locked on the locking protrusion, a closing cord guide is installed on the bottom of the front and rear sides of each of the opposite base plates, and a closing cord pulling device is installed on the front plate of the collection box body above the unlocking device, wherein two closing cords are wound on a winch member of the closing cord pulling device and are guided to opposite closing cord guides, respectively, while the ends of the closing cords are fixed to the rear plate of the collection box body, respectively.

2. The chip collection box according to claim 1, wherein the locking device has a configuration in that: lower blocks are mounted at front and rear ends of the oil tray, which has a trough portion in a "V" shape therein, to face each other such that a latch having a tooth portion on an upper side thereof is disposed to elastically move up and down in a vertical direction by a spring, and a rotary shaft is installed in the center of the lower blocks to penetrate front and rear sides thereof;
    a locking part locked on the inside and outside of the locking protrusion to be hooked on the top thereof is coupled with a lower part of a locking body, which has an outer protrusion to be pushed by a lower lever of the unlocking device, on front and rear ends of the rotary shaft penetrating the front and rear sides toward the outside of the lower blocks by means of bolts, and a spring is provided between one upper side of the locking body and a predetermined position outside the lower block in order to return the locking body rotating about the rotary shaft to its original position; and
    a latch plate, in which several teeth selectively engaged with the tooth portion of the latch are formed downward, is installed on an inner surface of the locking body, while a latch presser is provided in the collection box body below the locking protrusion wherein the latch presser presses the top surface of the latch so as to release engagement between the teeth of the latch plate and the tooth portion of the latch.

3. The chip collection box according to claim 1, wherein the unlocking device has a configuration in that: a rotary lever is rotatably mounted on the front plate of the collection box body above the locking protrusion, wherein the rotary lever includes horizontal levers and a lower lever formed on opposite sides and the lower side of a central boss part, respectively; the unlocking device is provided with an opening cord pulling device on top thereof, in which a first opening cord exists to pull the horizontal lever on one side ("the one horizontal lever") of the rotary lever; and a spring for returning the rotated rotary lever to its original position and a connection rod to pull the outer end of an idle lever, respectively, are provided on the horizontal lever on the other side ("the other horizontal lever") of the rotary lever, and
    wherein the opening cord pulling device has a configuration in that: an opening cord pulling member and an opening cord guide roller, respectively, are mounted on an opening cord bracket installed on the upper portion of the collection box body, wherein the opening cord pulling member is mounted on one side of a rotational body rotating around an axis such that an eccentric protrusion protrudes outward; a first opening cord is connected between the eccentric protrusion and the one horizontal lever; and a second opening cord to release a locking state of the locking device is disposed to be guided to an opening cord guide roller and then to be exposed to the outside while an end of the second opening cord is fixed on the outer end of the eccentric protrusion.

4. The chip collection box according to claim 1, wherein the closing cord pulling device has a configuration in that: a pulley housing is installed on the front plate of the collection box body, and a pulley is mounted on the pulley housing to freely rotate, wherein a clutch shaft extending in front of the pulley is installed to protrude to the front of the pulley housing, a male clutch part is fixed on an outer periphery of the clutch shaft in front of the pulley housing, and a tooth type first ratchet ring is fixed on an outer periphery of the male clutch part;
    an idle lever having a through-hole formed thereon in a desired size, into which the male clutch part can be fitted, is provided on the outer periphery of the clutch shaft in front of the male clutch part so as to possibly run idling, wherein a second ratchet ring detachably engaged with the first ratchet ring is provided on an inner surface of the idle lever outside the through-hole, and the other end of the connection rod connected to the horizontal lever of the rotary lever is connected to an outer end of the idle lever in a hinged manner;
    a clutch pipe is movably installed in a longitudinal direction along the clutch shaft on the clutch shaft outside the idle lever, wherein a female clutch part detachably engaged with the male clutch part via the through-hole is formed on a front end of the clutch pipe, a boss part of a rotational handle is fixed on the outside of the clutch pipe, a spring is provided on the clutch shaft in front of the clutch pipe to push the clutch pipe toward the male clutch part, and a spring support is provided at a rear end of the clutch shaft; and the ends of two closing cords are wound on the pulley inside the pulley housing in a fixed state, lateral rollers are installed on opposite sides of the pulley housing, respectively, in front of the collection boxy body, opposite closing cords coming from the pulley to opposite sides are guided by the lateral rollers to move downward, and then, are guided to the front and rear opening cord pulling members mounted on the base plate and, thereafter, the rear ends of the two closing cords are fixed on the rear plate of the collection box body.

* * * * *